United States Patent
Constantine et al.

(10) Patent No.: US 10,264,722 B2
(45) Date of Patent: Apr. 23, 2019

(54) BULB PLANTER

(71) Applicant: Acme United Corporation, Fairfield, CT (US)

(72) Inventors: Richard S. Constantine, Monroe, CT (US); Siu-Leung Tang, Hong Kong (CN)

(73) Assignee: Acme United Corporation, Fairfield, CT (US)

( * ) Notice: Subject to any disclaimer, the term of this patent is extended or adjusted under 35 U.S.C. 154(b) by 43 days.

(21) Appl. No.: 15/490,143

(22) Filed: Apr. 18, 2017

(65) Prior Publication Data
US 2018/0295772 A1    Oct. 18, 2018

(51) Int. Cl.
*A01C 5/02* (2006.01)
*A01C 7/02* (2006.01)

(52) U.S. Cl.
CPC . *A01C 5/02* (2013.01); *A01C 7/02* (2013.01)

(58) Field of Classification Search
CPC .................................. A01C 5/02; A01C 7/02
USPC .................................. 111/99, 107, 106, 114
See application file for complete search history.

(56) References Cited

U.S. PATENT DOCUMENTS

| | | | | |
|---|---|---|---|---|
| 2,149,880 A * | 3/1939 | Boordsen | ................. | A01C 5/02 111/92 |
| 2,510,584 A * | 6/1950 | Kanagawa | ............... | A01C 5/02 111/101 |
| 2,865,315 A * | 12/1958 | Goldstein | ................ | A01C 5/02 111/92 |
| 4,694,760 A * | 9/1987 | Camp | ...................... | A01C 5/02 111/92 |
| 7,150,238 B1 * | 12/2006 | Kontorovich | ............ | A01C 5/02 111/92 |
| 7,819,447 B1 * | 10/2010 | Ange | ....................... | A01C 5/02 294/50.8 |
| 2005/0241155 A1 * | 11/2005 | Demar | ..................... | A01C 5/02 30/174 |

* cited by examiner

*Primary Examiner* — Alicia Torres
(74) *Attorney, Agent, or Firm* — Alix, Yale & Ristas, LLP

(57) ABSTRACT

The bulb planter employs a pair of members which cooperate to form a generally cylindrical structure with a working end in a closed position. One member pivots to an open pivoted position wherein the members separate at the working ends. An angularly displaceable lever is forced toward a handle to actuate the member for pivoting. Upon release of the lever, the member pivots back to the closed position.

9 Claims, 6 Drawing Sheets

BULB PLANTER

BACKGROUND

This disclosure relates generally to tools employed in planting and gardening including planting activities. More particularly, this disclosure relates to tools employed for planting bulbs.

A number of tools have been advanced to facilitate the planting of bulbs. Such tools typically address the task of digging a relatively small bore into the ground at a depth which may be from 4 inches to 8 inches below ground level so that the bulb may be placed in the ground and covered. While conventional common gardening tools such as small shovels, spades and other implements can be employed for planting bulbs, specialized augers and bulb planters are also widely used.

One conventional type of bulb planter to which the present invention relates, employs a pair of cooperative rounded legs which are hinged. The distal end of each leg has a rounded profile which forms a generally cylindrical bore with a plurality of end recesses to facilitate penetration into the ground. The legs extend to a pair of upper lever-type arms. The arms connect with an upper handle which has a telescopic form. To actuate pivotal movement of the working ends of the legs, the arms are biased outwardly, but may manually be moved toward each other which, in turn, causes the working ends to pivot outwardly. One of the deficiencies of the latter noted conventional bulb planter is that the telescopic movement of the handle may result in pinching or even cutting the user while it is being used to prepare the hole for the bulb to be planted.

SUMMARY

Briefly stated, a bulb planter comprises a first member having a rounded working portion with a working end having angularly spaced recesses and defining a generally arcuate profile and having an opposed actuating portion. A second member is hinged to the first member and has a rounded working portion with a working end having angularly spaced recesses and defining an arcuate profile and an opposed actuating portion. A handle assembly is disposed at each said actuating portion. An actuating assembly adjacent to the handle assembly comprises a bent lever. The bent lever has a grip portion spaced from the handle and an engagement portion. The engagement portion is engageable with a spring loaded slider assembly between a first position wherein the first and second member working ends are in a convergent or closed position and a second position wherein the working ends are in a divergent or opened position. When the grip portion is forced toward the handle assembly, one working end is pivoted to the divergent position. When the grip portion is released, the working end returns to the convergent position.

The slider assembly comprises a slider which is slidably receivable in a tube disposed in fixed relationship to the handle assembly. A spring is interposed at an end of the tube and biased against the slider. A fastener extends through the slider and is threadably adjustable. The engagement portion extends through a slot of the first member and has an opening through which the fastener extends. The engagement portion is engaged against the head of the fastener. The grip portion is at a first angled position relative to the handle in the convergent position and is generally parallel to the handle in the divergent position. A lug extends from an end of the tube and traverses through an opening of the second member. The fastener threadably engages a cap mounted to the second member.

In one embodiment, a bulb planter comprises a first member having an arcuate skirt portion defining a working end and an opposing portion forming an arm. A second member has an arcuate skirt portion defining a working end and an opposing portion forming an arm and is connected to the first member. In a first pivotal position, the members are generally engaged and form an enclosure. In a second pivotal position, the working ends separate from each other. A handle is mounted to the first and second arms and extends generally transversely thereto. An actuating assembly is disposed adjacent the handle. The actuating assembly comprises a lever arm having an angularly displaceable manual actuator disposed between the first and second arms. When the manual actuator is forced toward the handle, one member pivots from the first pivotal position to the second pivotal position.

The actuating assembly comprises a spring loaded slider which is displaced when the actuator is forced toward the handle. A spring biases the slider to return the member to the first pivotal position upon releasing the actuator. The lever arm preferably has a bent configuration.

A bulb planter may also comprise a first member having a working portion and an opposing portion forming an arm. A second member has a working portion and an opposing portion forming an arm. The second member is pivotally connected to the first member in a first pivotal position wherein the working portions are generally engaged and form an enclosure. The members are relatively pivotable to a second pivotal position wherein the working portions separate from each other. A handle is mounted to the first and second arms and extend generally transversely. An actuating assembly comprises a lever arm having an angularly displaceable manual actuator disposed between the first and second arms. When the actuator is forced toward the handle, one member pivots relative to the other member from the first pivotal position to the second pivotal position.

DETAILED DESCRIPTION

Figure 1:
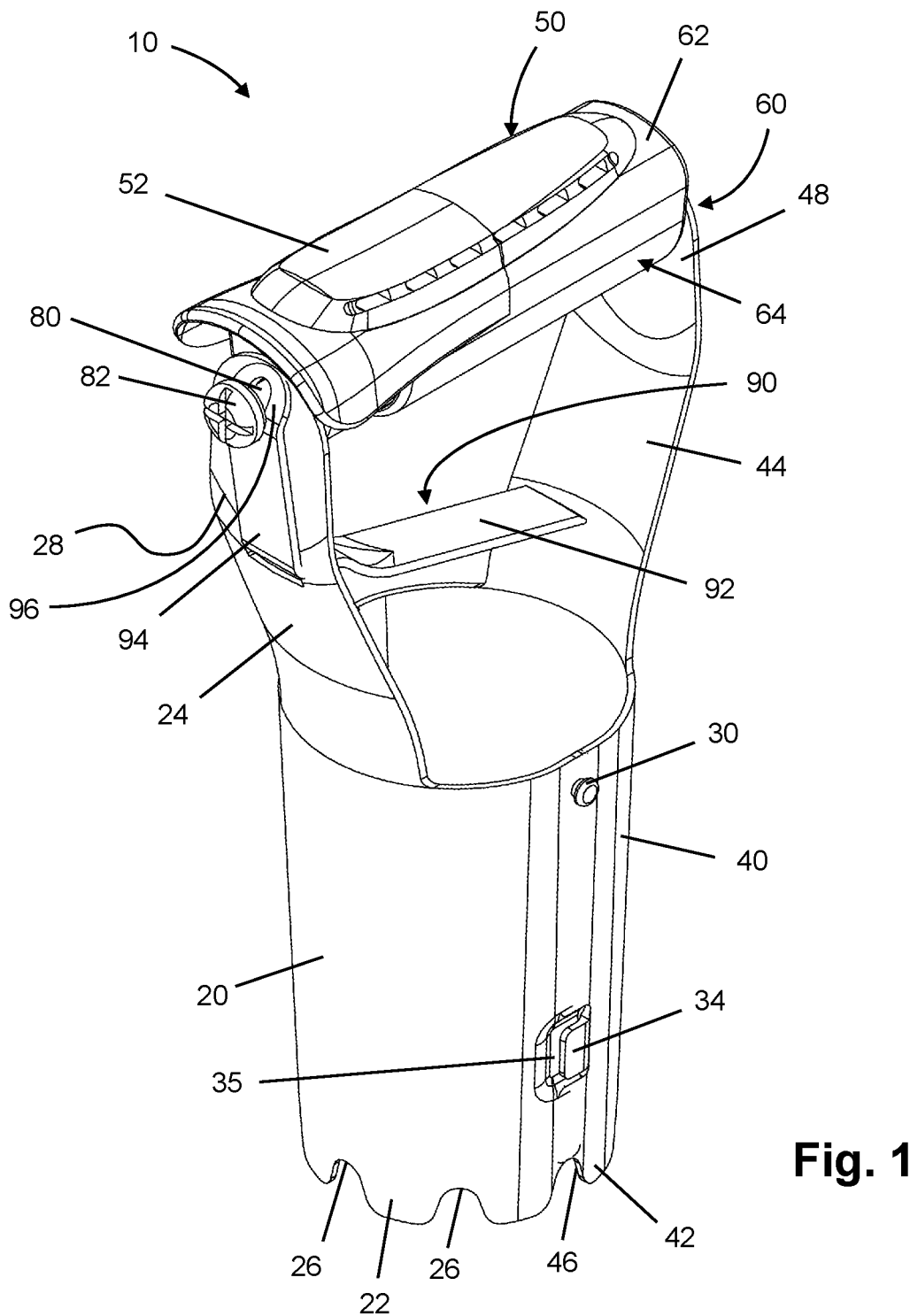
FIG. 1 is a perspective view of a bulb planter in an unactuated operative closed position.
Figure 2:
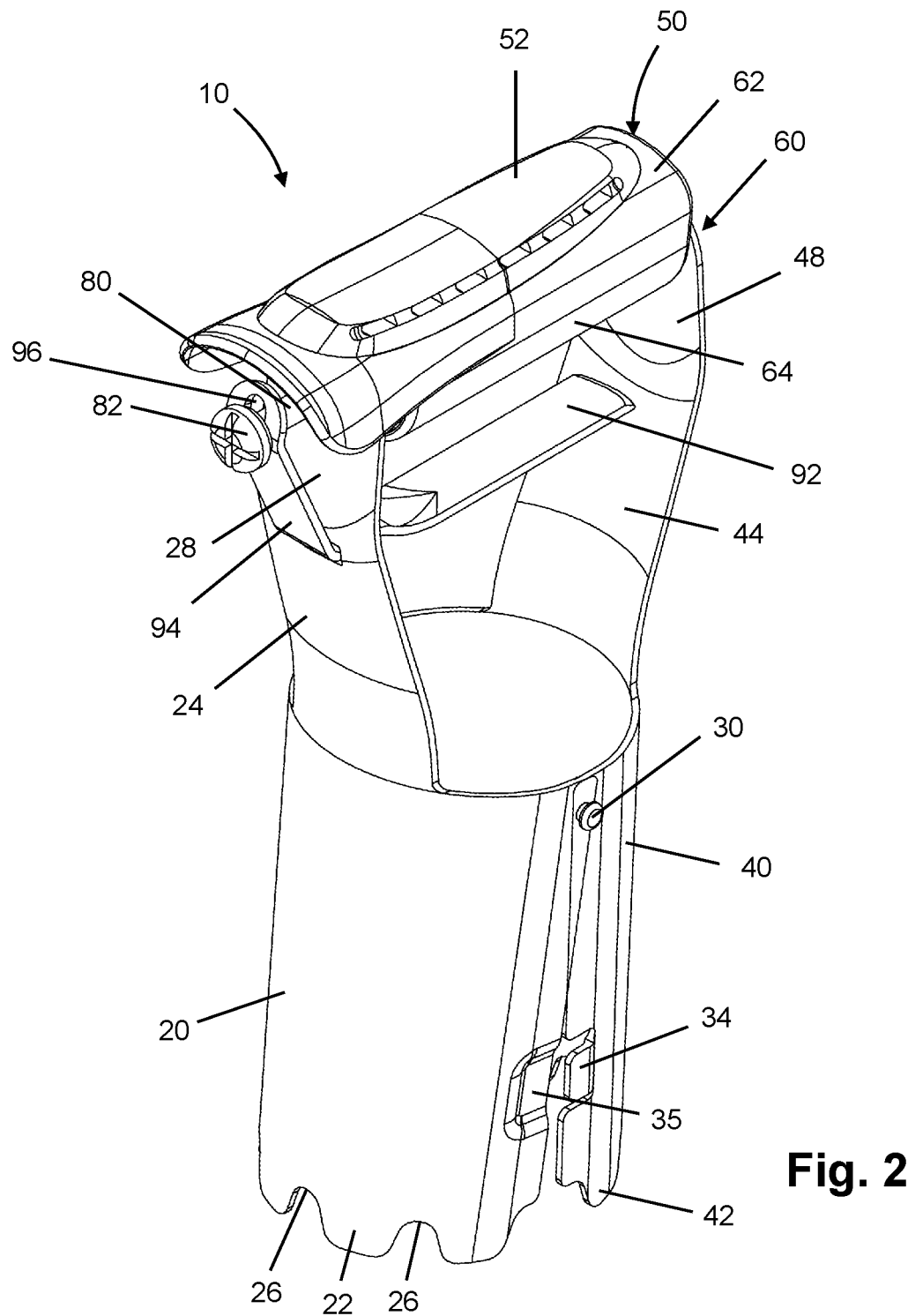
FIG. 2 is a perspective view of the bulb planter of FIG. 1 in an actuated opened expanded position.

With reference to the drawings wherein like numerals represent like parts throughout the several figures, a bulb planter is generally designated by the numeral 10. The bulb planter is a handheld manually operated tool which is particularly adapted to dig a bore in the ground for planting a bulb. The bulb planter is manually transformable from a closed operative position such as illustrated in FIG. 1, to an opened expanded operative position such as illustrated in FIG. 2, to facilitate the bore forming process by removing ground material. The normal, unactuated state of the bulb planter 10 illustrated in FIG. 1 is configured to facilitate manual penetration into the ground to form the bulb planting bore.

The bulb planter 10 comprises a pair of cooperative members 20 and 40 which have respective working ends 22 and 42, respectively, and integrally connect with upper arms 24 and 44, respectively. The members 20 and 40 are connected by a bifurcated hinge 30 which provides for a limited pivotal movement of the first member relative to the second member. The members each also include respective resilient tabs 34 and 36 which are engageably received in a corresponding indentation 35 and 37 of the opposing members in the closed position.

The lower portions of the members have a rounded skirt-like shape and each form a generally arcuate or semicircular profile at the lower end. Recesses 26 and 46 are formed in the lower working ends of the members to facilitate rotatable penetration into the ground.

The upper arms 24 and 44 flare outwardly at their intermediate portions. The arms 24 and 44 each have a reverse bend to form arm segments 28 and 48 so that arm segment 28 extends toward arm segment 48 and arm segment 48 extends upwardly at their upper portions. The arm segments 28 and 48 mount a handle 50 and an actuating assembly 60, as will be further described.

Figure 4:
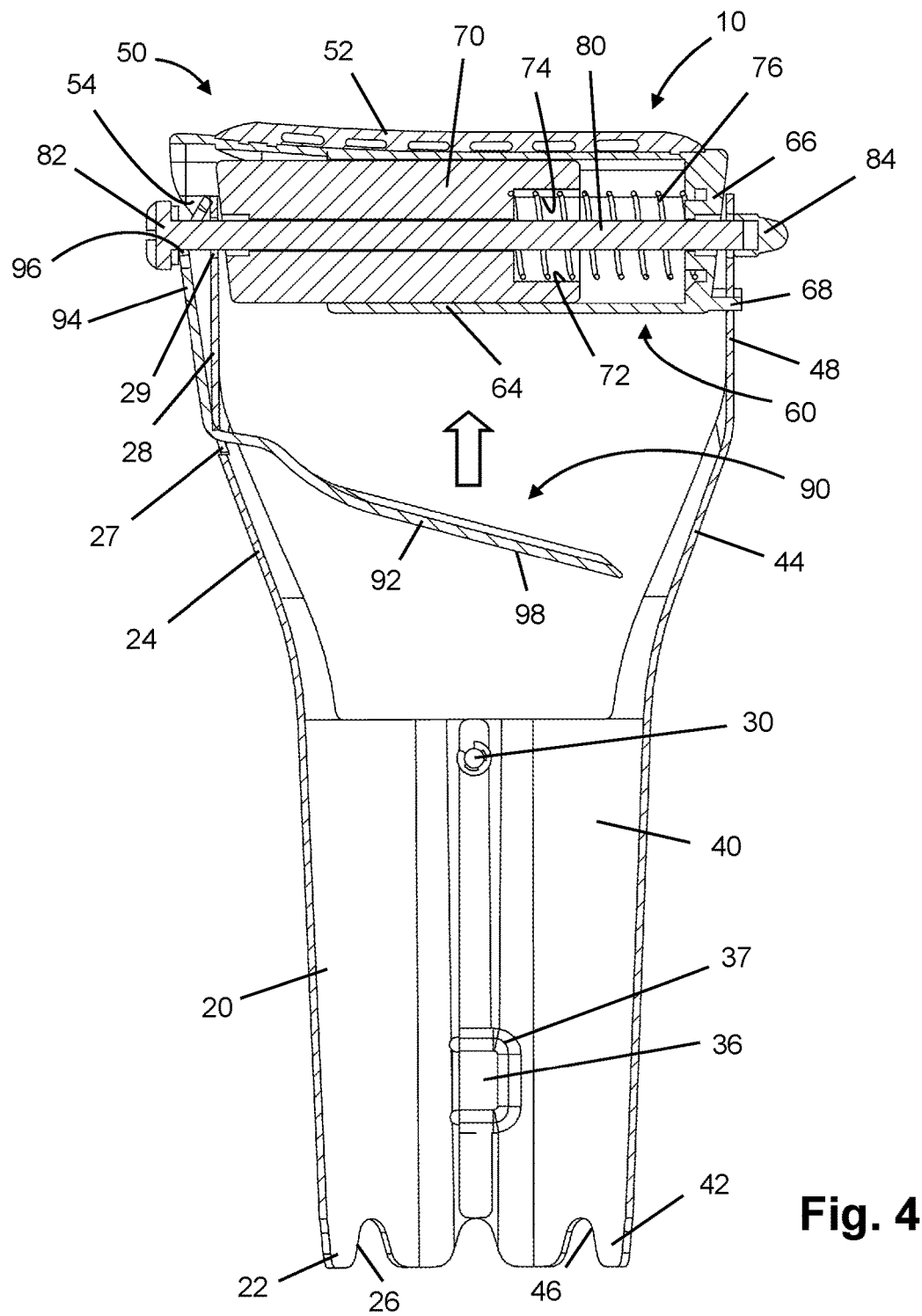
FIG. 4 is a central sectional view of the bulb planter of FIG. 3 in the closed position.
Figure 6:
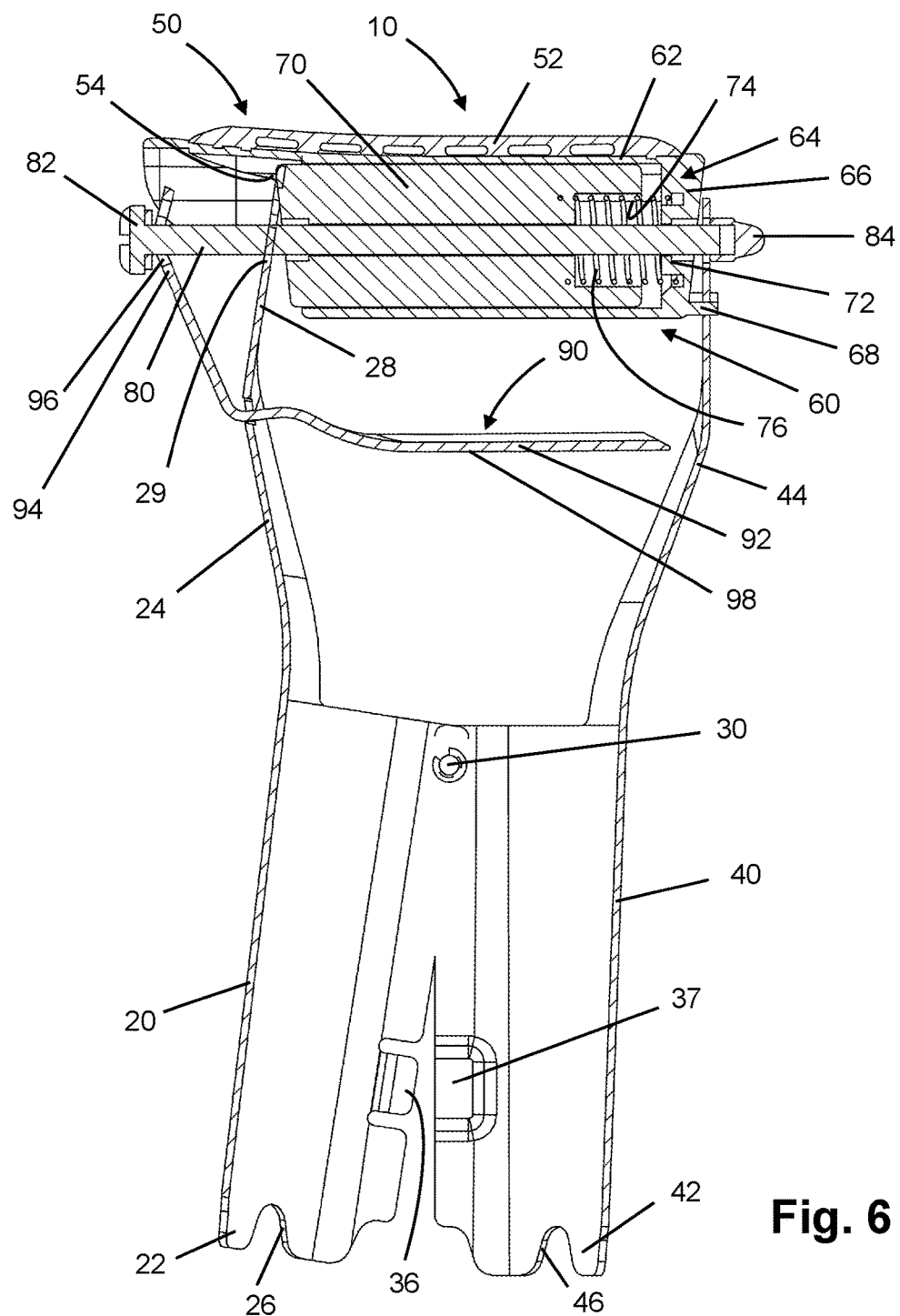
FIG. 6 is a central sectional view of the bulb planter of FIG. 5 in the opened position.

The handle 50 includes an upper surface which preferably has a cushioned grip 52 secured to a contoured top saddle-like panel 62 of a quasi-tubular element 64 having a closed end 66. With reference to FIGS. 4 and 6, one underside portion of the handle forms a shoulder 54. Tubular element 64 slidably receives a slider 70 transversely displaceable therein. The slider 70 has a central stepped bore 72. The stepped bore receives a fastener 80 which has a head 82.

The upper end of the arm segment 28 supports the shoulder 54 of the handle. Arm segment 28 also includes an opening 29 through which the fastener 80 extends. The upper end of arm segment 48 mounts a laterally projecting cap 84 which receives the end of the fastener and also has an opening through which the fastener extends. The upper arm segment 48 also receives a support lug 68 projecting transversely from the closed end of the tube to support the tube assembly. The slider 70 includes a large counter bore 74 which receives a spring 76. In the unactuated state, the spring 76 biases the slider to the extended position as illustrated in FIG. 4. The spring 76 and fastener 80 are coaxial.

An actuating lever 90 has a compound bend and includes an actuator arm 92 which extends into a free space region between the arms 24 and 44 and through a slot 27 on the side of arm segment 28 and extends upwardly at an angle to integrally join a translator arm 94. The translator arm 94 includes a slot 96 which receives the shank end of the fastener 80 adjacent the head 82. In the drawing illustrated in FIG. 4, the engagement end or translator arm 94 of the actuating lever is slightly bent to engage the underside of the handle shoulder 54 and arm segment 28. The latter configuration constitutes the unactuated closed operative position.

Figure 5:
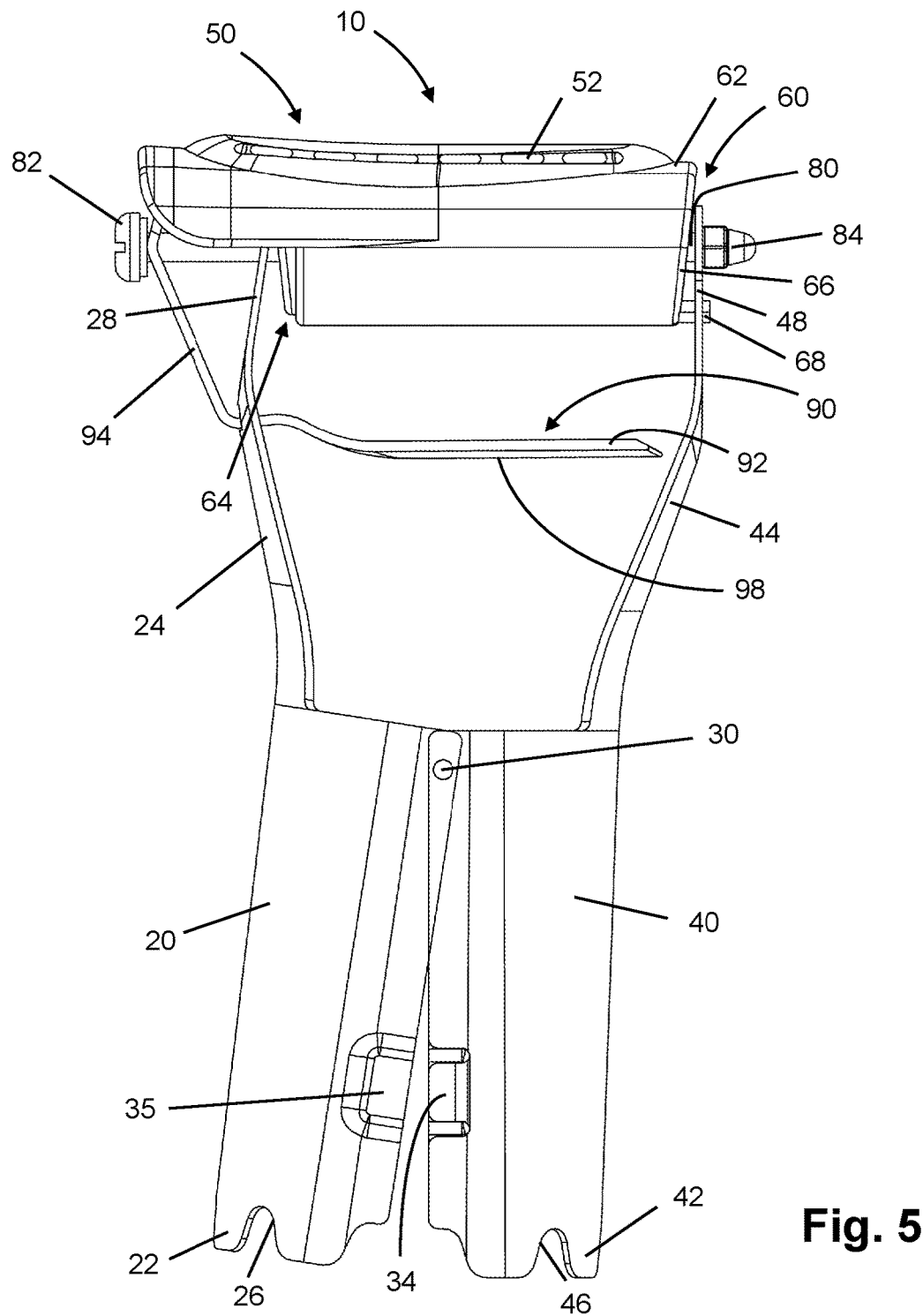
FIG. 5 is a frontal view of the bulb planter of FIG. 2 in the opened position.

When it is desired to pivot the first member 20 outwardly to a divergent position relative to the second member 40, the underside 98 of the actuating lever 90 is manually grasped by the fingers while the hand rests on the top portion or grip 52 of the handle. The lever arm 94 is squeezed or compressed toward the handle 50 (in the direction of the FIGS. 3 and 4 arrows) to the actuated position best illustrated in FIGS. 2, 5 and 6. As illustrated in FIG. 6, the engagement end 94 of the actuating lever 90 forces the slider 70 to the right and compresses the spring 76. Because the arm engages the shoulder underside, the segment 28 is forced to pivot outwardly relative to segment 48. Tabs 34 and 36 separate from the respective indentations 35 and 37.

Figure 3:
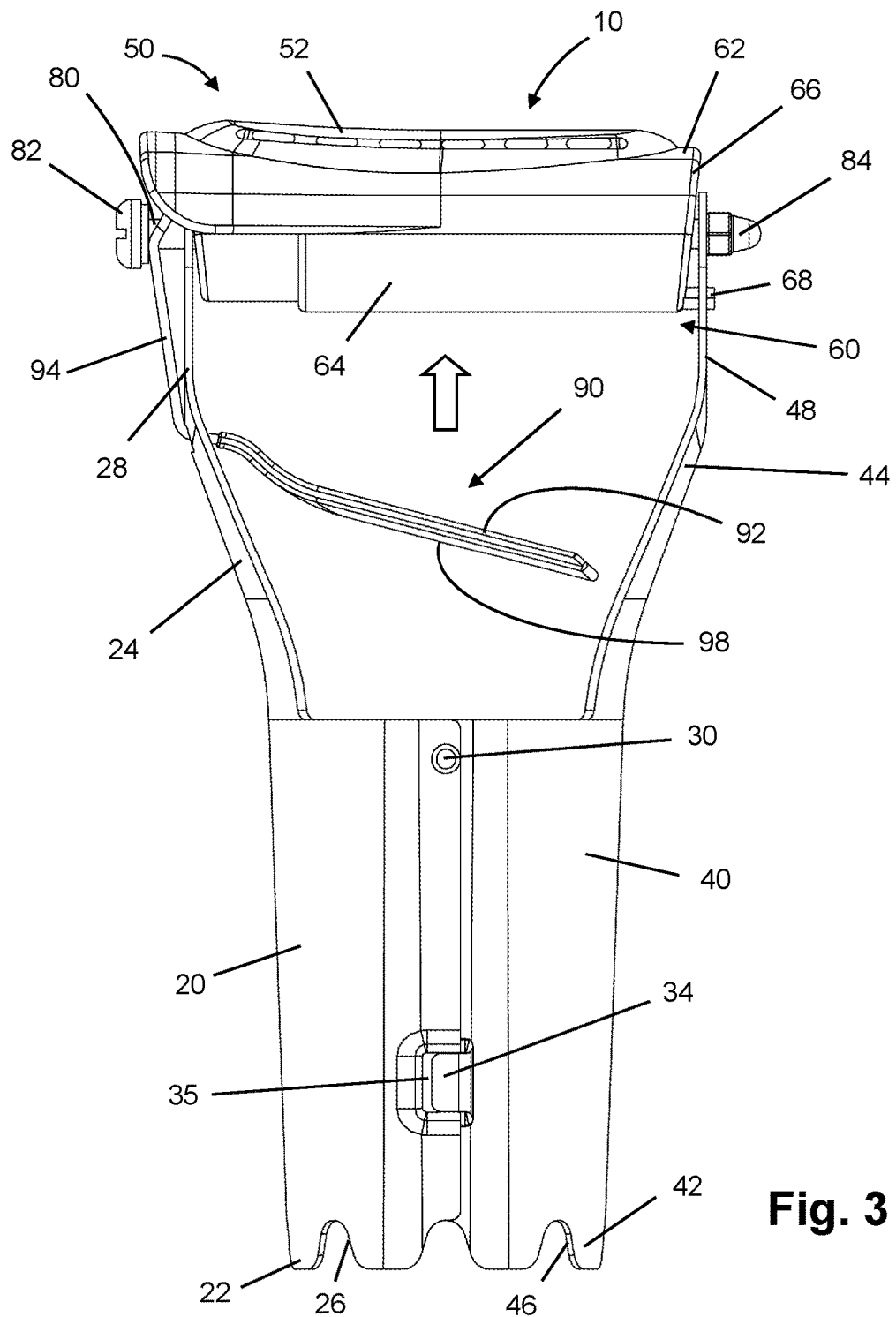
FIG. 3 is a frontal view of the bulb planter of FIG. 1 in the actuated closed position.

When the compressive actuating force is removed from the actuating lever 90, the actuating lever 90 resumes the position best illustrated in FIGS. 1-3 because the spring 76 forces the slider 70 to the extended position wherein the members 20 and 40 are essentially closed on each other.

While a preferred embodiment of the foregoing has been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A bulb planter comprising:
a first member having a rounded working portion with a working end having angularly spaced recesses and having an opposed actuating portion;
a second member hinged to said first member and having a rounded working portion with a working end having angularly spaced recesses and having an opposed actuating portion;
a handle assembly disposed at each said actuating portion; and
an actuating assembly adjacent said handle assembly comprising a bent lever having a grip portion spaced from said handle and an engagement portion engageable with a spring loaded slider assembly between a first position wherein said first and second members working ends are in a convergent position and a second position wherein said working ends are in a divergent position, said slider assembly comprising a slider which is slidably receivable in a tube disposed in fixed relationship to said handle assembly and a spring is interposed at an end of said tube and biased against said slider,
so that when said grip portion is forced toward said handle, said working ends separate to the divergent position and when said grip portion is released, said working ends are returned to the convergent position.

2. The bulb planter of claim 1 further comprising a fastener which extends through said slider and is threadably adjustable.

3. The bulb planter of claim 2 wherein said engagement portion extends through a slot of said first member and has an opening through which said fastener extends and said engagement portion is engaged against a head of said fastener.

4. The bulb planter of claim 1 wherein said grip portion is at a generally first angled position relative to said handle in said convergent position and is generally parallel to said handle in said divergent position.

5. The bulb planter of claim 1 further comprising a lug extending from an end of said tube and traversing through an opening of said second member.

6. The bulb planter of claim 2 wherein said fastener threadably engages a cap mounted to said second member.

7. The bulb planter of claim 1 wherein the spring biases said slider to return said members to the first position upon releasing said grip portion.

8. The bulb planter of claim 1 wherein said bent lever has a multiple bend configuration.

9. The bulb planter of claim 2 wherein the spring biases said slider to return said members to the first position upon releasing said grip portion.

\* \* \* \* \*